United States Patent [19]
Stahl

[11] Patent Number: 6,095,725
[45] Date of Patent: Aug. 1, 2000

[54] DRILLING TOOL

[75] Inventor: Frank Stahl, Pleidelsheim, Germany

[73] Assignee: Komet Praezisionswerkzeuge Robert Breuning GmbH, Besigheim, Germany

[21] Appl. No.: 09/029,099

[22] PCT Filed: Aug. 15, 1996

[86] PCT No.: PCT/EP96/03597

§ 371 Date: Jun. 18, 1999

§ 102(e) Date: Jun. 18, 1999

[87] PCT Pub. No.: WO97/06913

PCT Pub. Date: Feb. 27, 1997

[30] Foreign Application Priority Data

Aug. 21, 1995 [DE] Germany ............... 195 30 595

[51] Int. Cl.[7] .................................................. B23B 51/02
[52] U.S. Cl. .................... 408/223; 408/1 R; 408/226; 408/230; 408/59; 408/713
[58] Field of Search .................... 408/229, 230, 408/705, 713, 1 R, 223, 224, 225, 227, 226, 57, 59

[56] References Cited

U.S. PATENT DOCUMENTS

| 5,425,604 | 6/1995 | Scheer et al. | 408/705 |
| 6,012,881 | 1/2000 | Scheer | 408/226 |

FOREIGN PATENT DOCUMENTS

| 123 878 | 11/1984 | European Pat. Off. . |
| 0 264 657 | 4/1988 | European Pat. Off. . |
| 358 901 | 3/1990 | European Pat. Off. . |
| 331 207 | 1/1921 | Germany . |
| 42 14 528 | 11/1992 | Germany . |
| 61-284 311 | 12/1986 | Japan . |
| WO96/14954 | 5/1996 | WIPO . |

*Primary Examiner*—Steven C. Bishop
*Attorney, Agent, or Firm*—Flynn, Thiel, Boutell & Tanis, P.C.

[57] ABSTRACT

A drilling tool for machine tools includes a drill shank provided with a radially outwardly projecting feed helix. The drilling tool also includes a drilling head disposed at the end of the drill shank and having two segment sections which are delimited radially outwardly by partially cylindrical peripheral surfaces and separated from each other by axially parallel chip grooves which are adjacent in the peripheral direction. The drilling head also includes at least two cutting plates disposed at different radial spacings from a drilling tool axis and each having a cutting edge projecting beyond the drilling head. The chip grooves are delimited on the side of the cutting plates by at least one axially parallel radial chip-deflection surface and by a chip-guide surface disposed on the adjacent segment section. The chip-deflection surfaces terminate at an axial spacing from the cutting edges at a substantially radial rear free edge and merge there into a chip-feed surface which delimits the relevant segment section at the rear in the direction of the drill shank, rising helically to the following chip channel. The annular space between the chip-feed surface and the end of the feed helix at the drilling head end forms a chip-stowing space from which the chips produced during drilling are carried away by the helix.

27 Claims, 4 Drawing Sheets

DRILLING TOOL

FIELD OF THE INVENTION

The invention is related to a drilling tool for machine tools, especially for machining metal or plastic workpieces.

BACKGROUND OF THE INVENTION

A drilling tool of this type is known (DE-A-42 14 528), which is adapted to be clamped in a machine spindle and comprises a drill shank provided with a feed helix delimiting a chip removal groove and a drill head disposed on the face of the drill shank. The drill head has two segment portions which are delimited radially outwardly by partially cylindrical circumferential surfaces which together form a common circumferential cylinder and which are separated from each other by chip channels which adjoin each other in a circumferential direction, which are aligned essentially axially parallel, and which merge in the chip removal groove in the chip flow direction. The drill head further has at least two cutting inserts which are disposed at different radial distances from the axis of the drill with partially overlapping working areas in an appertaining recess of the segment portions in the region of an axially parallel radial chip diverting surface, preferably with the face aligned thereto, and which have at least one active cutting edge protruding over the face of the drill head, wherein the cutting edge of the outermost cutting insert protrudes radially over the appertaining partially cylindrical circumferential surface and wherein the drill head has a larger outer diameter than the drill shank. By a specific alignment of the cutting inserts which partially overlap in the effective region of their cutting edges it is ensured that the lateral forces acting on the cutting edges during the drilling operation are essentially compensated, so that workpieces can be bored essentially without guide means. The centering is effected by means of an axially centered centering drill. The chip grooves which extend axially parallel along the drill shank and which have a triangular cross section each merge in the direction of chip flow in a relatively steep helical chip transport groove provided in the drill shank, which grooves are formed into the material of the shank. The edges of the chip removal grooves are delimited by a feed helix which serves on the one hand to guide the drill within the bore hole and on the other hand to delimited the chip removal grooves. A separate chip removal groove is assigned to each chip channel in the drill shank, into which groove the channel merges in the direction of chip flow. In this design the chips are especially pushed outwards through the chip removal grooves under the influence of a coolant. By the forming of the comparatively broad feed helix, it is attempted to prevent chips from being distributed out of the chip removal grooves over the circumference of the drill shank, which would otherwise bear the danger of the chips fusing with the bore wall and the drill shank, thus leading to a destruction of the bore and the drilling tool. A further problem exists in that the chip channel forms, in the region of the inner insert, a comparatively broad chip space having a triangular cross section, which chip space tightens toward the rear in the direction of chip flow in a funnel-like manner. This leads to the result that the chip may be formed to be relatively broad during its creation and then has to be forced into the chip removal groove with deformation work. By this a large amount of the thrust energy imparted to the chips in their creation is lost in the form of deformation work and cannot be used to aid the removal of the chips. Furthermore, the deformation forces are partially transformed into lateral forces which cause a radial deflection of the drill head and therefore a degradation of the drilling efficiency and quality. For this reason guideless drills of this type can be employed only for comparatively shallow bores up to a depth of up to 6×D, wherein D denotes the diameter of the bore.

Based on this it is the object of the invention to develop a drilling tool which may be used for great bore depths of 12×d and more, and which still guarantees an effective and almost lateral force-free chip flow.

SUMMARY OF THE INVENTION

The solution according to the invention is based foremost on the idea that a thrust force is imparted to the comparatively long flowing chips and shearing chips by the tool feed before their removal from the workpiece, which thrust force can be used to aid chip removal under suitable geometric conditions. In this, use is made of the recognition that a chip deformation, which leads to chip compression and lateral forces, must be avoided after the creation of the chips. In order to achieve this, it is proposed according to the inventive method that the chips are transported from their point of origin into an annular, axially extending chip collecting space formed between a drill shank and the bore wall, before at least a fraction of these is separated from the workpiece, and that at least a fraction of the chips is form-fittingly picked up in the region between two lock or screw turns by a feed helix, one end of which is adjacent to the chip collecting space and which protrudes over the drill shank with a smaller diameter than the bore and co-rotates with the drilling tool, and is transported essentially axially parallel out of the bore hole under friction with the bore wall and gliding up on the feed helix. It may further be achieved that further chips, which are entangled with the chips form-fittingly gliding up on the feed helix, are transported in packets out of the bore hole.

With respect to the device this aim can be realized in that the chip channels have a chip guiding surface which is opposed to the chip diverting surface on the side of the cutting insert and which is aligned essentially parallel thereto and is disposed on the adjacent segment portion and/or that the chip diverting surfaces terminate at an axial distance from the cutting edges at an essentially parallel aligned rearward free edge and merge thereat into a chip removal surface which rearwardly delimits the appertaining segment portion in the direction of the drill shank and which ascends helically in the direction of chip travel to the next chip channel with an angle of ascent of less than 40°. The axial extent of the chip diverting surface between the effective cutting edges and the free edge should be chosen to be comparatively short and should correspond to approximately 1.5 to 3 times the diameter of the circumscribing circle of the cutting inserts. It is thus ensured that a major fraction of the flowing chips or shearing chips created in the drilling process reach the chip removal surface before they are totally removed from the workpiece. In order to make the transfer of the chips to the chip removal surface easier, the chip guiding surfaces should have an axial extent which is preferably 1.5 to 3 times greater than that of the adjacent chip diverting surfaces, and the chip guiding surfaces should be angled off at their rearward end in the direction of the chip diverting surface and chip removal surface of the adjacent segment portion.

In order to be able to modularly assemble the drilling tool matching it to the intended application, it is proposed according to a preferred embodiment of the invention that the drill head is removably connected to the drill shank and/or that the drill shank consists of at least two shank sections which are joined to each other at axial separation points, wherein the appertaining sections of the feed helix merge into each other without steps and/or gaps in the region of the separation point.

The chip channels on the side of the drill axis are expediently delimited in the region between the chip diverting surface and the chip guiding surface by a chip deflecting surface which broadens conically from the entrance point at the side of the cutting edge up to the diameter of the drill shank. In this, it is of importance that the chip collecting space following the chip channels in the direction of chip flow expands with respect to the cross section of the chip channels, so that the entering chips can be pushed largely without force into the chip collecting space.

Due to the fact that the chip guiding surfaces block the immediate working and mounting access to the adjacent chip diverting surfaces, additional measures have to be taken which enable the production of the cutting insert seats and the mounting of the cutting inserts. These measures may, for example, consist in that the cutting inserts are disposed in at least one exchangeable holder which is removably fixed to the segment portions of the drill head, which holder can in turn be mounted in a corresponding recess of the segment portions. Additionally or alternatively, the part of the segment portions which entails the chip guiding surface can be formed to be a separate filling piece which is removably fixed to the appertaining segment portion and preferably consists of hard material.

The design of the drill head according to the invention makes it possible that exit nozzles for a coolant are disposed on the face of the segment portions in the proximity of the chip guiding surfaces, which nozzles are directed obliquely at the cutting inserts. The draining coolant contributes additionally to the chip removal.

For the centering of the drill head in the bore hole it is of advantage, especially when drilling deep bores, when the drill head comprises an exchangeable centering drill which is disposed axially centered and axially protrudes over the face of the drill head and the effective cutting edges of the cutting inserts. The working region of the radially innermost cutting insert should in any case extend to and overlap with that of the centering drill. The centering drill may also be provided with a coolant bore which opens essentially axially close to the drill tip.

According to a preferred embodiment of the invention, it is provided that the feed helix has a diameter which is larger than the diameter of the drill shank and which is smaller than the diameter of the drill head. The width of the feed helix should be less than one fifth, preferably less than one tenth, of its pitch which defines the width of the chip removal groove. The annular space, which is thus created and which is penetrated by the feed helix, between the drill shank and the bore wall should be dimensioned such that the chips fit through the annular space and can be form-fittingly picked up at their lock or screw turns by the feed helix rotating past. To this end, the feed helix expediently has a smooth surface with a preferably rounded cross section. In general, the feed helix may also have a three-edged or four-edged cross section with rounded edges. It may, for instance, be formed to be a wire helically encompassing the cylindrical drill shank, preferably welded thereon, wherein the helically wound wire may also be placed onto the drill shank such that it cannot slip and is fixed to the drill shank only with its ends, preferably by means of welding. According to a further preferred embodiment of the invention, it is provided that the feed helix is disposed on the outer surface of a piece of pipe adapted to be removably placed onto the drill shank. This design has the advantage that pieces of pipe with differently designed and dimensioned feed helixes may easily be substituted for one another in order to be matched to the chip shapes created during the drilling process.

The drill head side end of the feed helix expediently ends at an axial distance from the chip removal surface of the drill head, so that an axial chip collecting space is formed, in which larger and smaller chips may be entangled in packets before they are picked up by the feed helix. The removal of the chips is then effected due to the friction with the bore wall essentially axially by means of the feed helix rotating past. The angles of ascent of the feed helix and of the drill head side chip removal surface are expediently chosen to be approximately of the same magnitude. They are preferably less than 25°.

BRIEF DESCRIPTION OF THE DRAWINGS

In the following, the invention is further described with reference to the accompanying drawing, in which.

DETAILED DESCRIPTION OF THE INVENTION

Figure 1A:
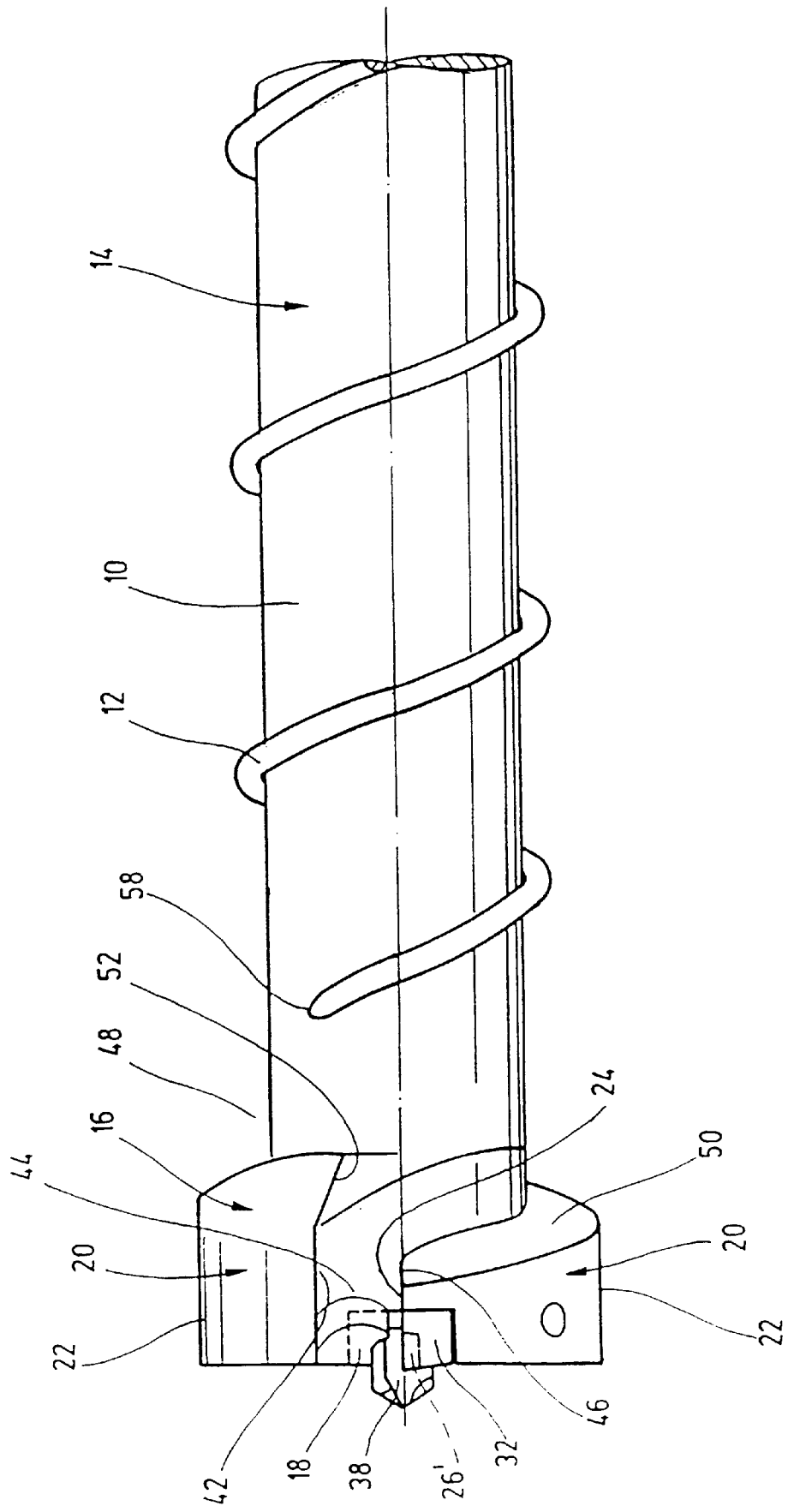
FIG. 1a and FIG. 1b show two side views of a drilling tool from two directions which are rotated by 90° with respect to each other.

The drilling tool shown in the drawings consists essentially of a drill shank 14 provided with a feed helix 12 delimiting a helical chip removal groove 10 and adapted to be clamped in a machine spindle (not shown) and a preferably removable drill head 16 disposed on the face of the drill shank 14. The drill head has two segment portions 20 which are delimited radially outwardly by partially cylindrical circumferential surfaces 22 and which are separated from each other by chip channels 18 which are aligned essentially axially parallel. Further, three cutting inserts 26, which are radially spaced with respect to each other and to the drill axis, are disposed in the region of the axially parallel, radial chip diverting surfaces 24 of the chip channels 18, the faces 28 of which inserts 26 are, in the depicted embodiment, aligned with respect to the corresponding chip diverting surfaces 24 and the effective cutting edges 30 of which protrude over the front of the drill head 16. The cutting inserts 26 are arranged in groups of three in an exchangeable holder 32 which is disposed in a corresponding recess 34 of the drill head 16 and clamped therein by means of screws 36. The cutting edge 30 of the radially outermost cutting insert 26' radially protrudes by a small amount over the circumference of the appertaining segment portion 20 and defines the bore diameter D. A centering drill 38 is additionally removably mounted in an axially centered bore of the drill head 16, which centering drill axially protrudes with its tip over the front face of the drill head 16 and the cutting edges 30 of the cutting inserts 26, 26'.

Figure 1B:
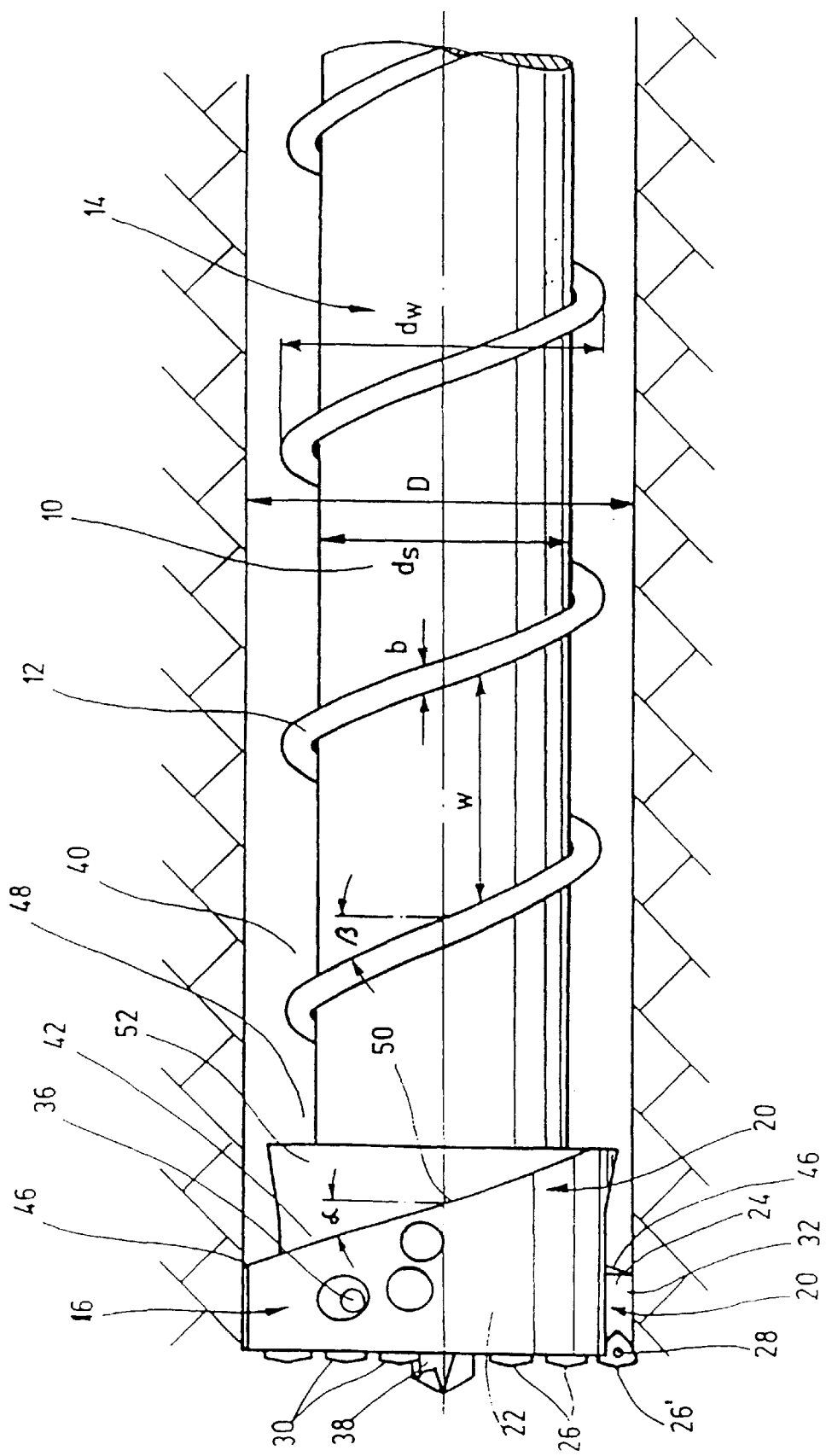
Figure 2:
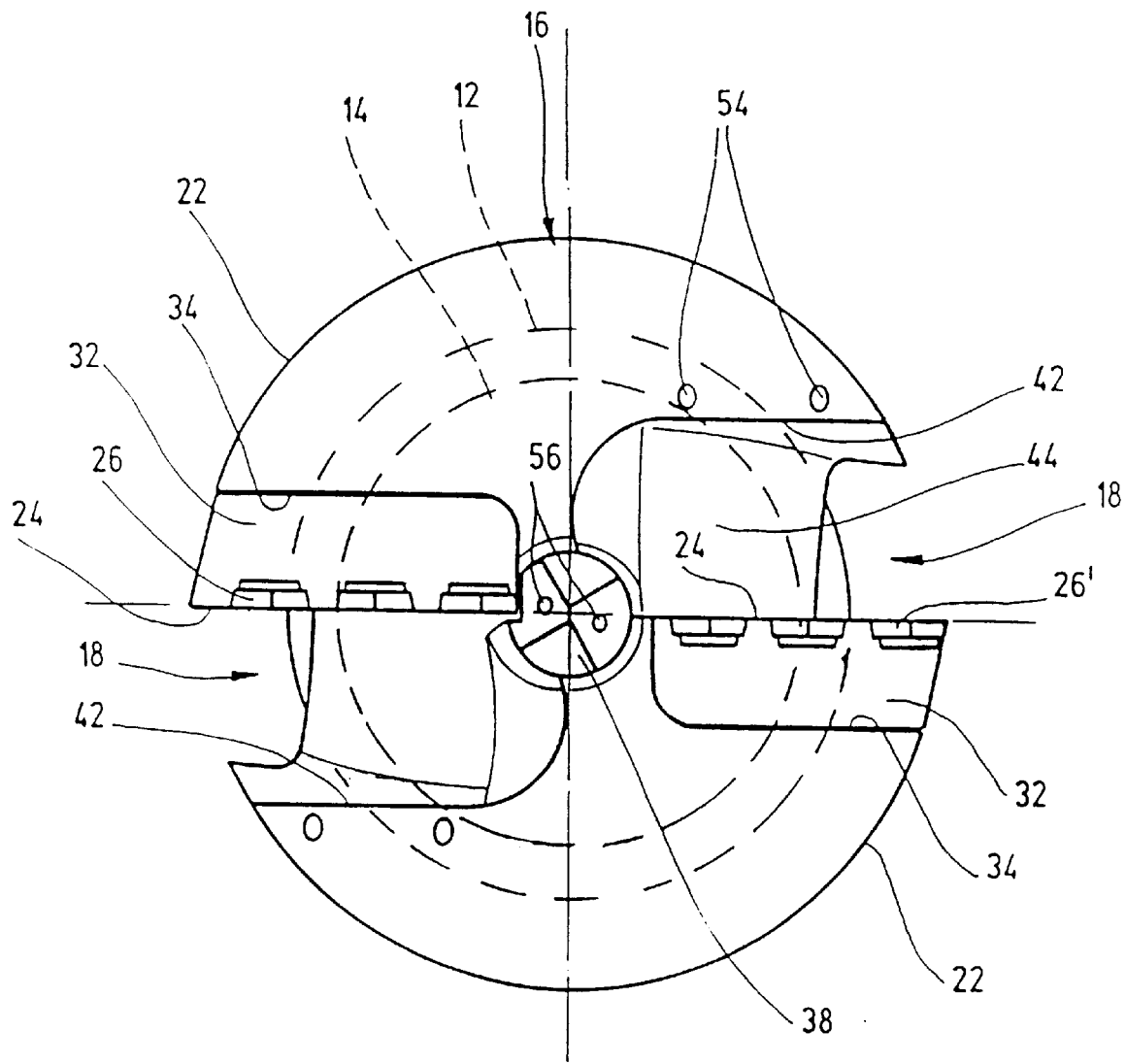
FIG. 2 shows a frontal face view onto the drill head of the drilling tool according to FIG. 1a and FIG. 1b.

As can be seen especially in FIG. 1a and FIG. 1b, the drill head 16 has a larger diameter than the drill shank 14. In this way there results during a drilling operation behind the drill head, an annular space 40 which extends along the drill shank 14 and is penetrated by the feed helix 12, and which is outwardly delimited by the bore wall, through which annular space the chips created by the drilling operation can be removed.

The chip channels 18 of the drill head have a chip guiding surface 42 disposed on the adjacent segment portion 20, which is located on the side opposite the cutting insert and opposed to the chip diverting surface 24 on the side of the cutting insert and aligned thereto essentially parallel, as well as a chip deflecting surface 44 arranged between the chip diverting surface 24 and the chip guiding surface 42, which conically widens from the cutting edge side entrance point up to the diameter of the drill shank 14. The chip guiding surface and the chip deflecting surface ensure that the chips cannot expand uncontrolled upon their creation, so that they can pass through the annular space 40 without deformation and compression.

The chip diverting surfaces 24 end at a comparatively short distance, which corresponds approximately to 1.5 to 3 times the diameter of the circumscribing circle of the cutting inserts, from the cutting edges at an essentially radially aligned rearward free edge 46, which is followed, under formation of an expanded chip collecting space 48, by a chip removal surface 50 which delimits the corresponding segment portion 20 rearwardly in the direction of the drill shank 14 and which ascends helically in the direction of chip flow toward the next chip channel 18 with an angle of ascent of approximately 20°. The chip guiding surfaces 42 are 1.5 to 3 times greater with respect to their axial extent than the adjacent chip diverting surfaces 24 and are angled off at their rearward end 52 in the direction of the chip diverting surface 24 and chip removal surface 50 of the adjacent segment portion 20. The inside edges between the chip deflecting surface 44 and the adjacent chip diverting, guiding and removal surfaces 24, 42, 50 are rounded and form distorted transitions for a smooth chip flow.

Exit nozzles 54 for a coolant and lubricant are disposed on the front face of the segment portions close to the chip guiding surfaces 42, which are directed obliquely in the direction of the cutting inserts 26. Further exit points 56 for coolant and lubricant are located in the vicinity of the tip of the centering drill 38. The coolant and lubricant emerging from the exit nozzles has the purpose of not only cooling but also to aid the chip flow through the chip channels 18 and the annular space 40.

The removal of lock-shaped and screw-shaped chips is preferably effected by means of the feed helix 12, though. To this end, the feed helix has an external diameter $d_w$ which is larger than the shank diameter $d_s$, but is smaller than the bore diameter D (see FIG. 1a and FIG. 1b). Further, the width b of the feed helix 12 is considerably smaller than its pitch w+b which defines the width w of the chip removal groove 10. The feed helix 12 can be formed onto the drill shank 14 or formed to be a wire helically surrounding the cylindrical drill shank and being welded thereto. At its drill head side end 58 the feed helix 12 ends at a distance from the helical chip removal surfaces 50 of the drill head and thereby delimits the helix-less chip collecting space 48. The angle of ascent of the feed helix corresponds approximately to the angle of ascent of the helical chip removal surfaces 50 and is approximately 20° in the depicted embodiment.

Figure 3:
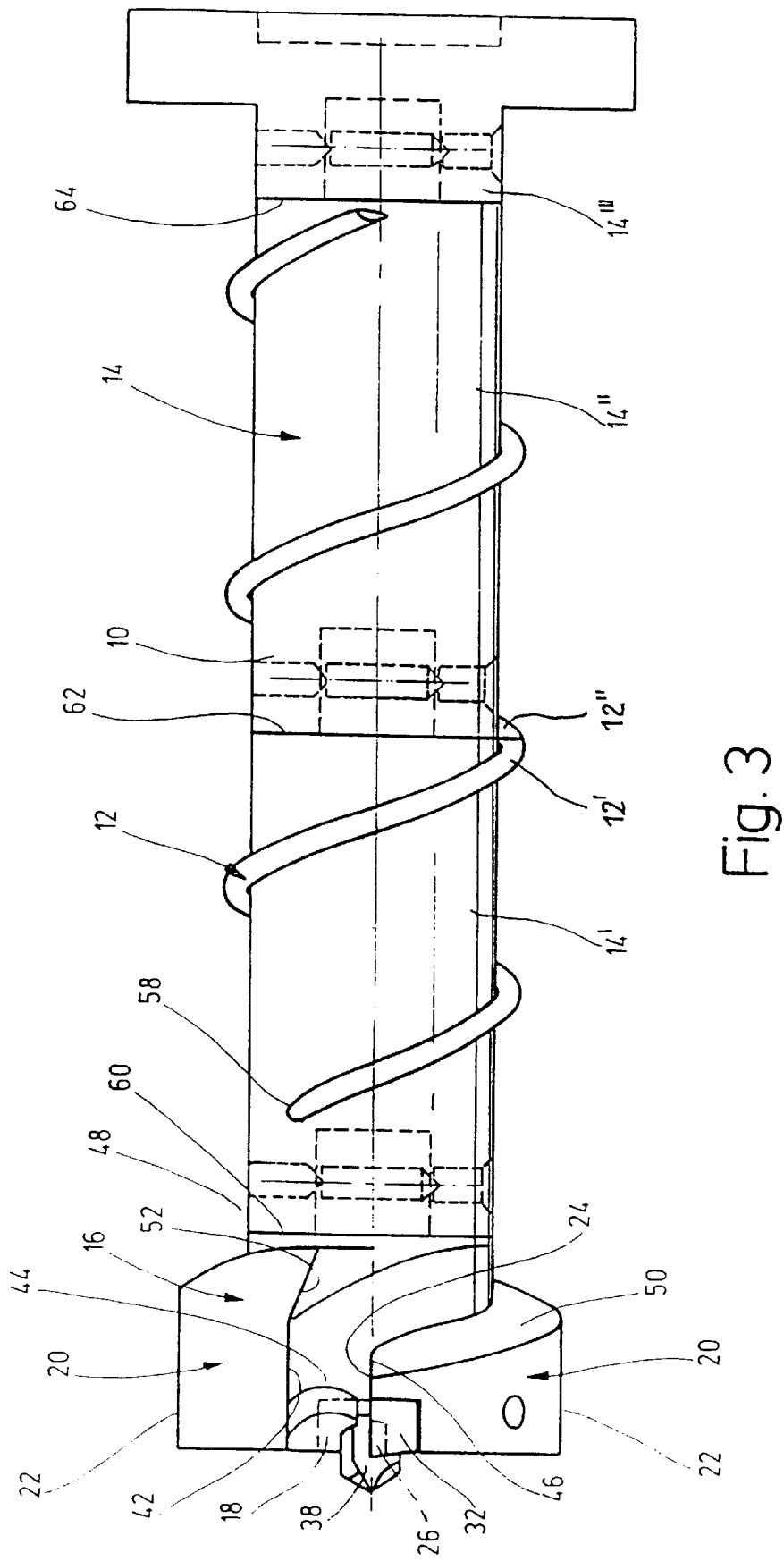
FIG. 3 shows a side view of a drilling tool having a removable drill head and modularly assembled shank sections.

The drilling tool shown in FIG. 3 differs from the drilling tool shown in FIGS. 1a and b in that drill head 16 is removably connected to the drill shank 14 at a separation point 60 and in that the drill shank 14 is composed of a number of shank sections 14', 14", 14'" which are connected to each other at separation points 62, 64. In order to avoid a chip jamming, the feed helix sections 12', 12" merge into each other without steps or gaps in the region of the separation point 62. It is thereby possible to modularly assemble the drilling tool to match the work to be performed.

The drilling tool described above is advantageously used for deep hole boring of workpieces, in which comparatively long, screw- or lock-shaped flow chips are created to some extent. A fraction of the flow chips is led through the chip channels 18 into the chip collecting space 48 in the region of the chip removal surface 50 by means of the chip guiding surfaces and the chip deflecting surfaces 44 before they are separated from the workpiece. In this, the thrust force imparted to the chip by the forward feed of the workpiece is used to remove the chips largely without compression or deformation work. Smaller and larger chips are entangled in the chip collecting space 48 and are picked up in packets by the feed helix and transported essentially axially outwards out of the annular space 40. In this, the feed helix form-fittingly engages the turns of the chips. The friction with the bore wall ensures that the chips glide up on the feed helix 12 and are transported out of the annular space in an essentially axially parallel direction. The flow of coolant and lubricant only has a supporting function in this process.

In summary the following is to be stated: The invention is related to a drilling tool for machine tools, comprising a drill shank 14 provided with a feed helix 12 delimiting a helical chip removal groove 10 and adapted to be clamped in a machine spindle, and comprising a drill head 16 disposed on the face of the drill shank 14. The drill head has two segment portions 20 which are delimited radially outwardly by partially cylindrical circumferential surfaces 22 which are seperated from each other by chip channels 18 which adjoin each other in a circumferential direction and which are aligned essentially axially parallel, and which drill head has at least two cutting inserts 26 which are disposed at different radial distances from the axis of the drill and which each have a cutting edge 30 protruding over the face of the drill head 16. The chip channels 18 are delimited on the side of the cutting inserts by an axially parallel, radial chip diverting surface 24 and by a chip guiding surface 42 which is opposed to the chip diverting surface 24 and which is aligned essentially parallel thereto and is disposed on the adjacent segment portion 20. The chip diverting surfaces 24 terminate at an axial distance from the cutting edges at an essentially parallel aligned rearward free edge and merge thereat into a chip removal surface 50 which rearwardly delimits the appertaining segment portion 20 in the direction of the drill shank 14 and which ascends helically in the direction of chip travel to the next chip channel 18. The annular space between the chip removal surface and the drill head side end 58 of the feed helix 12 forms a chip collecting space 48, from which the chips created in the drilling process are transported outwards in packets by the feed helix 12.

What is claimed is:

1. A drilling tool for machine tools, comprising a drill shank provided with a feed helix delimiting a helical chip removal groove and adapted to be clamped in a machine spindle, and comprising a drill head disposed on a face of the drill shank, said drill head including two segment portions delimited radially outwardly by partially cylindrical circumferential surfaces together forming a common circumferential cylinder and which are separated from each other by chip channels adjoining each other in a circumferential direction, the chip channels being aligned essentially axially parallel, and merging in the chip removal groove in a chip flow direction, and said drill head including at least two cutting inserts disposed at different radial distances from the axis of the drill head with partially overlapping working areas in an appertaining recess of the segment portions in the region of at least one axially parallel radial chip diverting surface with faces of said inserts aligned thereto, and having at least one active cutting edge protruding over a face of the drill head, wherein the cutting edge of the outermost cutting insert protrudes radially over the appertaining partially cylindrical circumferential surface and the drill head has a larger outer diameter than the drill shank, wherein the chip channels have at least one chip guiding surface opposed to the chip diverting surface on the side of the cutting insert and aligned essentially parallel thereto and disposed on the adjacent segment portion.

2. The drilling tool of claim 1, wherein the chip diverting surfaces terminate at an axial distance from the cutting edges at an essentially parallel aligned rearward free edge and merge thereat into a chip removal surface rearwardly delimiting the appertaining segment portion in the direction of the drill shank and ascending helically in the direction of chip travel to the next chip channel with an angle of ascent of less than 40°.

3. A drilling tool for machine tools, comprising a drill shank provided with a feed helix delimiting a helical chip removal groove and adapted to be clamped in a machine spindle, and comprising a drill head disposed on a face of the drill shank, said drill head having two segment portions delimited radially outwardly by partially cylindrical circumferential surfaces together forming a common circumferential cylinder and separated from each other by chip channels adjoining each other in a circumferential direction, aligned essentially axially parallel, and merging in the chip removal groove in a chip flow direction, and said drill head including at least two cutting inserts disposed at different radial distances from the axis of the drill head with partially overlapping working areas in an appertaining recess of the segment portions in the region of at least one axially parallel radial chip diverting surface with faces of said inserts aligned thereto, and having at least one active cutting edge protruding over a face of the drill head, wherein the cutting edge of the outermost cutting insert protrudes radially over the appertaining partially cylindrical circumferential surface and the drill head has a larger outer diameter than the drill shank, wherein the chip diverting surfaces terminate at an axial distance from the cutting edges at an essentially parallel aligned rearward free edge and merge thereat into a chip removal surface rearwardly delimiting the appertaining segment portion in the direction of the drill shank and ascending helically in the direction of chip travel to the next chip channel with an angle of ascent of less than 40°, and the angles of ascent of the feed helix and of the chip removal surface are approximately of the same magnitude.

4. The drilling tool of claim 1, wherein the axial extent of the chip diverting surface between the effective cutting edges and the free edge corresponds to 1.5 to 3 times the diameter of a circumscribing circle of the cutting inserts.

5. The drilling tool of claim 1, wherein the chip guiding surfaces have an axial extent which is 1.5 to 3 times greater than that of the adjacent chip diverting surfaces.

6. The drilling tool of claim 2, wherein the chip guiding surfaces are angled off at their rearward end in the direction of the chip diverting surface and the chip removal surface of the adjacent segment portion.

7. The drilling tool of claim 1, wherein the chip channels are delimited in the region between the chip diverting surface and the chip guiding surface by a chip deflecting surface which broadens conically from an entrance point at the side of the cutting edge up to the diameter of the drill shank.

8. The drilling tool of claim 1, wherein the cutting inserts are disposed in at least one exchangeable holder removably fixed to the segment portions of the drill head.

9. The drilling tool of claim 1, wherein a part of the segment portions which includes the chip guiding surface is formed as a separate filling piece removably fixed to the appertaining segment portion and comprising a hard material.

10. The drilling tool of claim 1, wherein the drill head comprises an exchangeable centering drill disposed axially centered and axially protruding from the face of the drill head and the active cutting edges of the cutting inserts.

11. The drilling tool of claim 10, wherein the working area of the radially innermost cutting insert extends to and overlaps with that of the centering drill.

12. The drilling tool of claim 1, wherein exit nozzles for a coolant are disposed on the face of the segment portions in the proximity of the chip guiding surfaces, said nozzles being directed obliquely at the cutting inserts.

13. The drilling tool of claim 10, wherein at least one coolant bore penetrates the centering drill essentially axially parallel to the axis of the drill head and opens close to a drill tip of the centering drill.

14. The drilling tool of claim 1, wherein the feed helix has a diameter larger than the diameter of the drill shank and smaller than the diameter of the drill head.

15. The drilling tool of claim 1, wherein the width of the feed helix is less than one fifth of its pitch defining the width of the chip removal groove.

16. The drilling tool of claim 1, wherein the feed helix includes a smooth surface with a rounded cross section.

17. The drilling tool of claim 1, wherein the feed helix is formed as a wire helically encompassing the cylindrical drill shank.

18. The drilling tool of claim 1, wherein the feed helix is formed as a helically wound wire placed onto the drill shank such that the wire cannot slip and is fixed to the drill shank by means of welding.

19. The drilling tool of claim 1, wherein the feed helix is disposed on an outer surface of a piece of pipe adapted to be removably placed onto the drill shank.

20. The drilling tool of claim 1, wherein the feed helix has a three-edged or four-edged cross section.

21. The drilling tool of claim 1, wherein a drill head side end of the feed helix ends at an axial distance from the chip removal surface of the drill head, thereby forming an axial chip collecting space.

22. The drilling tool of claim 1, wherein angles of ascent of the feed helix and of a chip removal surface are approximately of the same magnitude.

23. The drilling tool of claim 22, wherein the angle of ascent of the feed helix is less than 25°.

24. The drilling tool of claim 1, wherein the drill head is removably connected to the drill shank.

25. The drill tool of claim 1, wherein the drill shank comprises at least two shank sections joined to each other at axial separation points, wherein appertaining sections of the feed helix merge into each other without steps or gaps in the region of the separation points.

26. A method for removing chips, created in a drilling operation forming a bore hole in a workpiece with a rotating drilling tool, wherein the chips are transported from their point of origin into an annular, axially extending chip collecting space formed between a drill shank and a bore wall in the workpiece, before at least a fraction of the chips are separated from the workpiece, and that at least a fraction of the chips is form-fittingly picked up in the region between two lock or screw turns by a feed helix, one end of which is adjacent to the chip collecting space and which protrudes over the drill shank with a smaller diameter than the bore hole and co-rotates with the drilling tool, and the chips are transported essentially axially parallel out of the bore hole under friction with the bore wall and gliding up on the feed helix.

27. The method of claim 26, wherein further chips, which are entangled with the chips form-fittingly gliding up on the feed helix, are transported in packets out of the bore hole.

* * * * *